US009532048B2

(12) United States Patent
Tanner et al.

(10) Patent No.: US 9,532,048 B2
(45) Date of Patent: Dec. 27, 2016

(54) HIERARCHICAL MOTION ESTIMATION EMPLOYING NONLINEAR SCALING AND ADAPTIVE SOURCE BLOCK SIZE

(75) Inventors: Jason D. Tanner, Folsom, CA (US); Hong Jiang, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 470 days.

(21) Appl. No.: 13/977,392

(22) PCT Filed: Mar. 15, 2012

(86) PCT No.: PCT/US2012/029294
§ 371 (c)(1),
(2), (4) Date: Oct. 14, 2013

(87) PCT Pub. No.: WO2013/137890
PCT Pub. Date: Sep. 19, 2013

(65) Prior Publication Data
US 2014/0044368 A1  Feb. 13, 2014

(51) Int. Cl.
*H04N 7/12* (2006.01)
*H04N 19/56* (2014.01)
*G06T 7/20* (2006.01)
*H04N 19/53* (2014.01)

(52) U.S. Cl.
CPC ......... *H04N 19/0066* (2013.01); *G06T 7/2073* (2013.01); *H04N 19/53* (2014.11); *H04N 19/56* (2014.11)

(58) Field of Classification Search
CPC .... H04N 19/0066; H04N 19/53; H04N 19/56; G06T 7/2073
USPC .................................................. 375/240.07
See application file for complete search history.

(56) References Cited

U.S. PATENT DOCUMENTS

| 7,158,158 B1 | 1/2007 | Fleming et al. |
| 2003/0086622 A1 | 5/2003 | Klein et al. |
| 2006/0056719 A1* | 3/2006 | Yu .......................... H04N 19/57 382/239 |
| 2007/0076020 A1 | 4/2007 | Fleming et al. |
| 2008/0165850 A1 | 7/2008 | Sagetong et al. |

(Continued)

FOREIGN PATENT DOCUMENTS

| CN | 1711776 A | 12/2005 |
| TW | 2009-23843 A | 6/2009 |

(Continued)

OTHER PUBLICATIONS

Office Action for Taiwan Patent Application No. 102106221, dated Jul. 28, 2015, 7 pages.
International Preliminary Report on Patentability and Written Opinion received for PCT Patent Application No. PCT/US2012/029294, mailed on Sep. 25, 2014, 6 pages.

(Continued)

*Primary Examiner* — Allen Wong
(74) *Attorney, Agent, or Firm* — Lynch Law Patent Group, P.C.

(57) ABSTRACT

Systems, devices and methods are described including applying nonlinear scaling to a current image frame and a reference image frame to generate at least a corresponding current image layer and a corresponding reference image layer. Hierarchical motion estimation may then be performed using the nonlinearly scaled image layers. Further, source block size may be adaptively determined in a downsampled image layer and hierarchical motion estimation may be performed using the adaptively sized source blocks.

26 Claims, 11 Drawing Sheets

(56) References Cited

U.S. PATENT DOCUMENTS

| | | | | |
|---|---|---|---|---|
| 2008/0205526 A1* | 8/2008 | Kang | H04N 19/53 | 375/240.16 |
| 2008/0309831 A1* | 12/2008 | Jung | G06T 3/4007 | 348/744 |
| 2010/0284627 A1* | 11/2010 | Lin | H04N 5/145 | 382/275 |
| 2011/0109803 A1 | 5/2011 | Sharlet et al. | | |
| 2011/0194025 A1* | 8/2011 | Chen | H04N 19/53 | 348/452 |
| 2013/0148732 A1 | 6/2013 | Tanner et al. | | |

FOREIGN PATENT DOCUMENTS

| | | |
|---|---|---|
| TW | 2011-36317 A1 | 10/2011 |
| WO | 2011120221 A1 | 10/2011 |
| WO | 2013/137890 A1 | 9/2013 |

OTHER PUBLICATIONS

Office Action for Taiwan Patent Application No. 102106221, dated Apr. 14, 2015, 7 pages.

English Translation & Remarks of Office Action for Taiwan Patent Application No. 102106221, dated Apr. 14, 2015, 12 pages.

Taiwan IPO Search Report for Taiwan Invention Patent Application No. 102106221, mailed Apr. 8, 2015, 12 pages.

International Search Report and Written opinion received for PCT Patent Application No. PCT/US2012/029294, mailed on Nov. 26, 2012, 10 Pages.

Marquant, G. et al., "Extended Spatial Scalability for Non Dyadic Video Formats: From SDTV to HDTV", Optomechatronic Micro/Nan Devices and Components III, Oct. 8-10, 2007, Proceedings of SPIR, vol. 5960, Jan. 1, 2005, pp. 547-558.

Extended European Search Report for European Patent Application No. EP12871413, mailed Mar. 30, 2016, 7 pages.

First Office Action for Chines Patent Application No. 201280071369.4, mailed Apr. 6, 2016, 6 pages.

* cited by examiner

HIERARCHICAL MOTION ESTIMATION EMPLOYING NONLINEAR SCALING AND ADAPTIVE SOURCE BLOCK SIZE

BACKGROUND

Video codecs typically employ motion estimation (ME) to improve video compression performance by removing or reducing the temporal redundancy among the video frames. For encoding an input block, traditional ME is performed at an encoder module using a specified search window in at least one reference frame to find a motion vector that minimizes some difference metric such as the Sum of Absolute Differences (SAD) between an input source block and the reference block pointed to by the motion vector. The motion vector information may then be transmitted to a decoder module for motion compensation.

Generally, higher coding gains may be achieved during ME by employing larger search windows. However, using larger search windows increases the encoding complexity. Further, when employing hardware acceleration. ME search window size may be limited by on-chip memory size constraints. To address this problem, various advanced video codecs, such as advanced video coding (AVC), scalable video coding (SVC), VP8 and so forth, employ hierarchical motion estimation (HME) techniques to extend the search range while still using a relatively small search window. In typical HME, a full resolution video frame is successively downsampled by factors of two into multiple lower resolution downsampled image layers and motion vector predictors obtained via ME are propagated up through the image layers and refined to identify a motion vector for a block of the full resolution video frame or base layer.

In addition to scaling the image hierarchy by factors of two, typical HME schemes also employ a correspondingly scaled, fixed shape and size of source block when performing ME at the lower resolution downsample layers. For instance, for a 16×16 full resolution source size, a conventional HME scheme may employ a 8×8 source size at the first downsample layer, a 4×4 source size at the second downsample layer, and so forth. However, particularly with regard to low energy or flat image content, such approaches may generate suboptimal predictors by erroneously identifying local minima further away from details in the image content.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
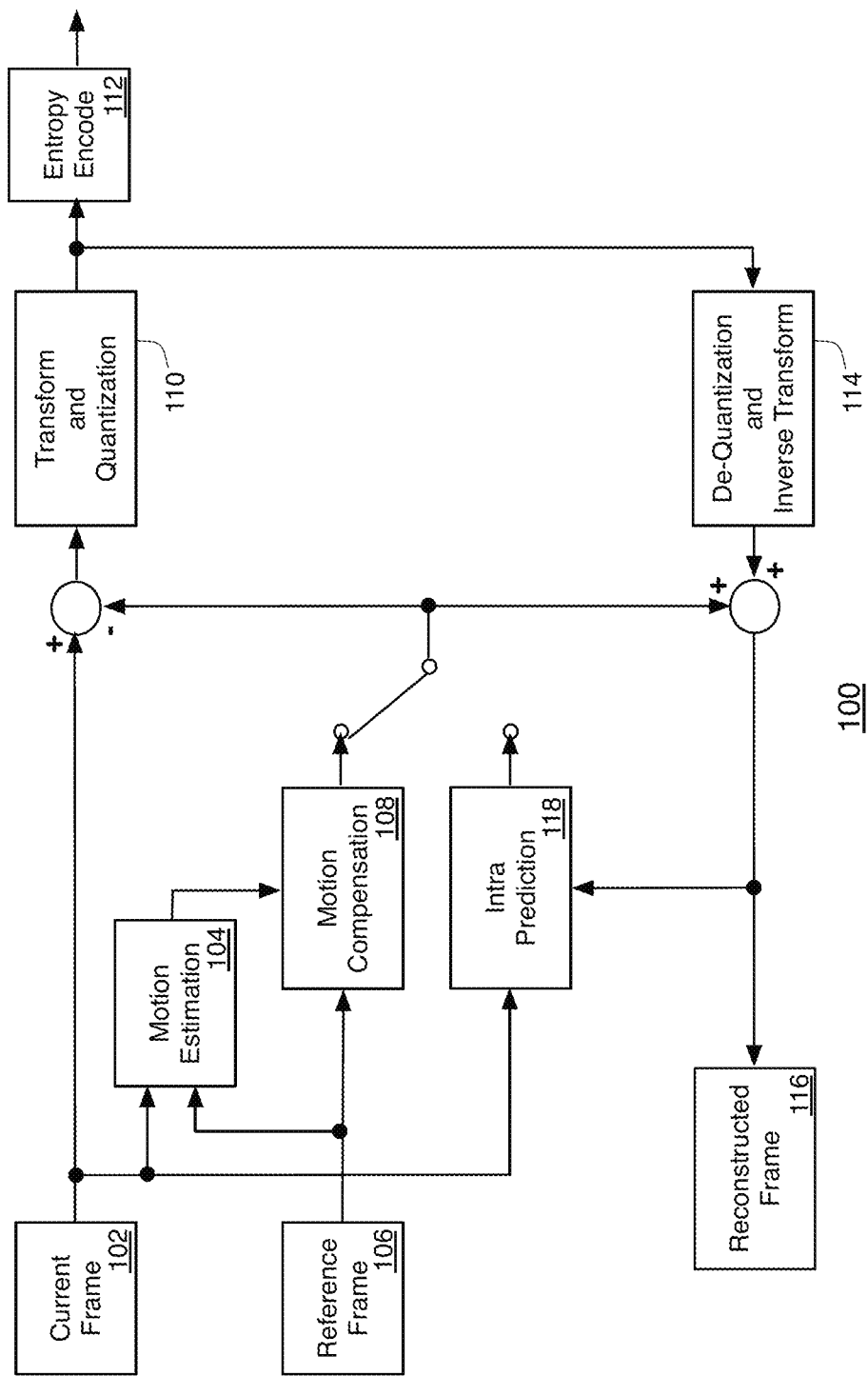
FIG. 1 is an illustrative diagram of an example video encoder system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning, integration choices, etc. claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g. a computing device). For example, a machine-readable medium may include read only memory (ROM); random access memory (RAM); magnetic disk storage media; optical storage media; flash memory devices; electrical, optical, acoustical or other forms of propagated signals (e.g. carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

FIG. 1 illustrates an example video encoder system 100 in accordance with the present disclosure. In various implementations, video encoder system 100 may be configured to undertake video compression and/or implement video codecs according to one or more advanced video codec standards, such as, for example, the H.264/AVC standard (see ISO/IEC JTC1 and ITU-T, H.264/AVC—Advanced video coding for generic audiovisual services," ITU-T Rec. H.264 and ISO/IEC 14496-10 (MPEG-4 part 10), version 3, 2005)(hereinafter: the "AVC standard") and extensions thereof including the Scalable Video Coding (SVC) extension (see Joint Draft ITU-T Rec. H.264 and ISO/IEC 14496-10/Amd.3 Scalable video coding, Jul. 5, 2007) (hereinafter the "SVC standard"). Although system 100 and/or other systems, schemes or processes may be described herein in the context of the AVC standard, the present disclosure is not limited to any particular video encoding standard or specification. For example, in various implementations, encoder system 100 may be configured to undertake video compression and/or implement video codecs according to other advanced video standards such as VP8, MPEG-2, VC1 (SMPTE 421M standard) and the like.

In various embodiments, a video and/or media processor may implement video encoder system 100. Various components of system 100 may be implemented in software, firmware, and/or hardware and/or any combination thereof. For example, various components of system 100 may be provided, at least in part, by hardware of a computing system or system-on-a-chip (SoC) such as may be found in a computing device, communications device, consumer electronics (CE) device or the like. For instance, at least part of system 100 may be provided by software and/or firmware instructions executed by processing logic such as one or more central processing unit (CPU) processor cores, a digital signal processor (DSP), an application specific integrated circuit (ASIC), a Fully Programmable Gate Array (FPGA), and so forth.

In encoder system 100, a current video frame 102 may be provided to a motion estimation module 104. System 100 may process current frame 102 in units of image macroblocks in raster scan order. When encoder system 100 is operated in inter-prediction mode (as shown), motion estimation module 104 may generate a residual signal in response to current video frame 102 and a reference video frame 106. A motion compensation module 108 may then use the reference video frame 106 and the residual signal provided by motion estimation module 104 to generate a predicted frame. The predicted frame may then be subtracted from the current frame 102 and the result provided to a transform and quantization module 110. The block may then be transformed (using a block transform) and quantized to generate a set of quantized transform coefficients which may be reordered and entropy encoded by an entropy encoding module 112 to generate a portion of a compressed bitstream (e.g., a Network Abstraction Layer (NAL) bitstream) provided by video encoder system 100. In various implementations, a bitstream provided by video encoder system 100 may include entropy-encoded coefficients in addition to side information used to decode each block (e.g. prediction modes, quantization parameters, motion vector information, and so forth) and may be provided to other systems and/or devices as described herein for transmission or storage.

The output of transform and quantization module 110 may also be provided to a de-quantization and inverse transform module 114. De-quantization and inverse transform module 114 may implement the inverse of the operations undertaken by transform and quantization module 110 and the output of de-quantization and inverse transform module 114 may be combined with the predicted frame to generate a reconstructed frame 116. When encoder system 100 is operated in intra-prediction mode, an intra prediction module 118 may use reconstructed frame 116 to undertake known intra prediction schemes that will not to be described in greater detail herein.

In general, frame 102 may be partitioned for compression by system 100 by division into one or more slices of macroblocks (e.g., 16×16 luma samples with corresponding chroma samples). Further, each macroblock may also be divided into macroblock partitions and/or into sub-macroblock partitions for motion-compensated prediction. In various implementations in accordance with the present disclosure, macroblock partitions may have various sizes including, but not limited to 16×16, 16×8, 8×16, while sub-macroblock partitions may also have various sizes including, but not limited to, 8×8, 8×4, 4×8 and 4×4. It should be noted, however, that the foregoing are only example macroblock partition and sub-macroblock partition shapes and sizes, the present disclosure not being limited to any particular macroblock partition and sub-macroblock partition shapes and/or sizes. As used herein, the term "block" may refer to a macroblock, a macroblock partition, or to a sub-macroblock partition of video data.

In various implementations, a slice may be designated as an I (Intra), P (Predicted), B (Bi-predicted), SP (Switching P) or SI (Switching I) type slices. In general, a frame may include different slice types. Further, frames may be designated as either non-reference frames or as reference frames that may be used as references for inter-frame prediction. In P slices, temporal (rather than spatial) prediction may be undertaken by estimating motion between frames. In B slices, two motion vectors, representing two motion estimates per macroblock partition or sub-macroblock partition may be used for temporal prediction or motion estimation. In addition, motion may be estimated from multiple pictures occurring either in the past or in the future with regard to display order. In various implementations, motion may be estimated at the various macroblock or sub-macroblock partition levels corresponding, for example, to 16×8, 8×16, 8×8, 8×4, 4×8, or 4×4 sizes mentioned above.

In various implementations, a distinct motion vector may be coded for each macroblock or sub-macroblock partition. During motion estimation processing a range of sub-macroblock shape candidates (e.g., 16×16, 16×8, 8×16, 8×8, 8×4, 4×8 and 4×4) may be searched, and a motion estimation scheme that optimizes the trade-off between the number of bits necessary to represent the video and the fidelity of the result may be implemented.

In various implementations, temporal prediction for a source block may be undertaken by searching multiple target regions in one or more reference frames as identified by two or more predictors associated with the source block. In various implementations, predictors may be determined at random, may be determined based on neighboring macroblocks, or may be determined based on various other known methods.

Various components of system 100 may be implemented in software, firmware, and/or hardware and/or any combination thereof. For example, various components of system 100 may be provided, at least in part, by hardware of a computing SoC such as may be found in a CE system. Those skilled in the art may recognize that video encoder system 100 may include additional components (e.g. filter modules and so forth) that have not been depicted in FIG. 1 in the interest of clarity.

In accordance with the present disclosure, employing nonlinear scaling between image layers in hierarchical motion estimation (HME) schemes may provide various advantages. For example, as noted in the background section above, linear scaling techniques downsample images by powers of two. For instance, when downsampling by a factor of two, linear scaling techniques generate image layers having one-fourth of the data content of the full resolution image frame thereby requiring a corresponding amount of computing resources to generate the image layers and store the image layers. In addition, scaling by two improves motion search speeds by only a factor of four. While linear scaling techniques may scale by a factor of four to further reduce resource usage and improve search speeds, the resulting sixteen-fold reduction in image data and hence image detail may yield less than satisfactory motion estimation results. By contrast, when employing nonlinear scaling in accordance with the present disclosure, image layer resolution may be reduced to conserve computing resources while, at the same time, retaining sufficient image layer resolution to maintain motion estimation fidelity. For instance, applying a nonlinear scaling factor of three results in a nine-fold reduction in image data while providing improved search speeds when compared to linearly scaling by two. In general, by employing nonlinear scaling in accordance with the present disclosure, different nonlinear scaling factors may be utilized to dynamically balance computing resource usage and motion search speed with motion estimation fidelity.

As used herein, the term downsampling describes the generation of a lower resolution (downsampled) image layer from a higher resolution image layer using various nonlinear scaling processes and schemes. Those of skill in the art may recognize that terms synonymous with downsampling, such as subsampling, may be used to describe the same or similar processes. Further, as used herein, nonlinear scaling refers to the changes in image resolution that result from downsampling an image frame or layer by a factor greater than two.

Figure 2:
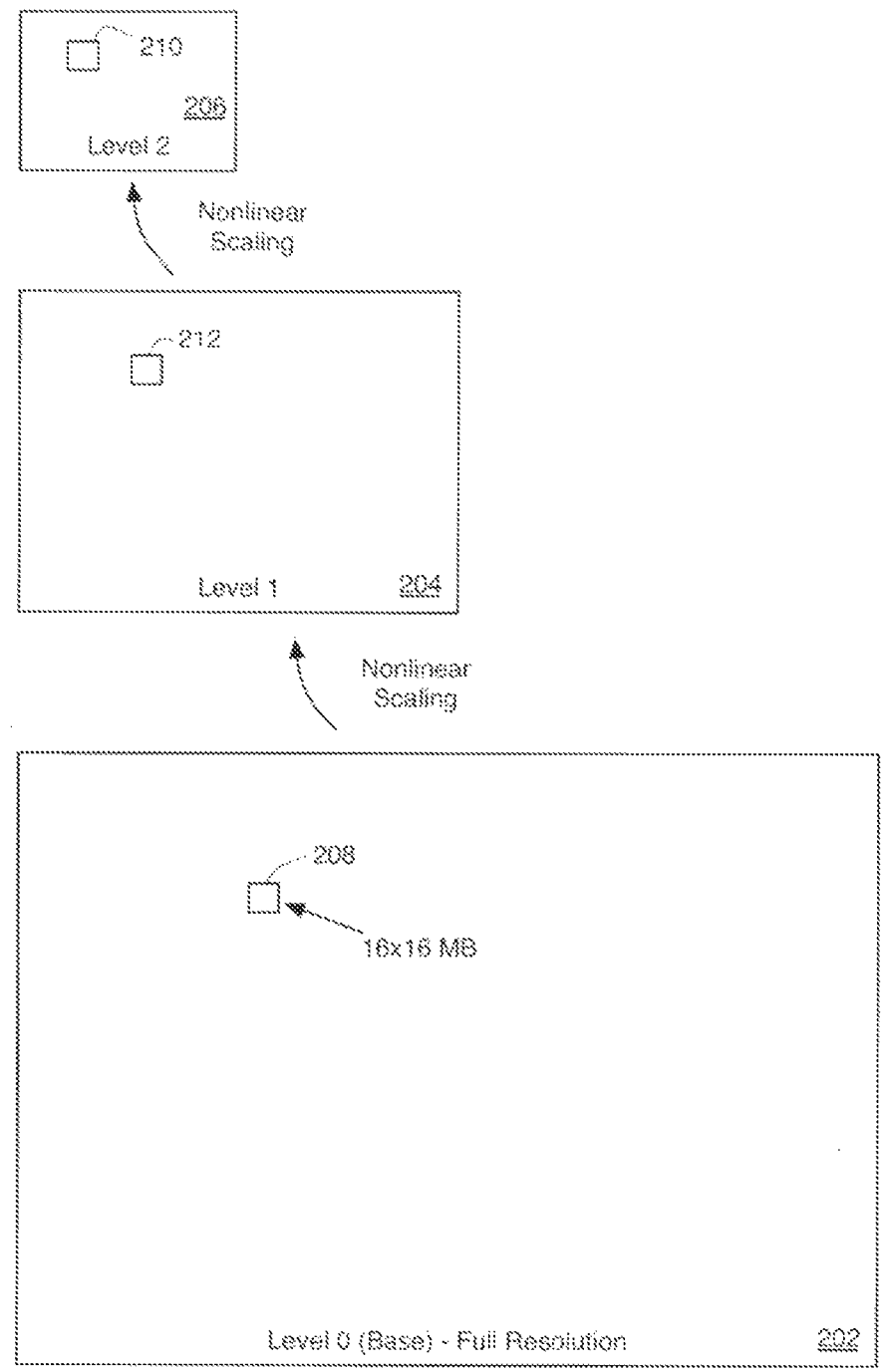
FIG. 2 is an illustrative diagram of an example nonlinear image scaling scheme.

In accordance with the present disclosure, video encoder system 100 may employ motion estimation module 104 to undertake one or more block matching algorithms that implement various hierarchical motion estimation (HME) schemes employing nonlinear scaling between image layers. In various implementations, video encoder system 100 may employ motion estimation module 104 to implement HME schemes employing nonlinear scaling between a full resolution base layer and one or more lower resolution, downsampled image layers. For example, FIG. 2 illustrates an example nonlinear image layer hierarchy 200 in accordance with the present disclosure. By way of non-limiting example, various items of FIG. 2 will be described herein with reference to example video encoder system 100 of FIG. 1.

In various implementations, non-linear scaling may be employed when performing HME to generate one or more image layers where each dimension of an input, full resolution (or base) image frame may be downsampled by a factor greater than two. Further, in various embodiments, nonlinear scaling factors greater than two and less than four may be applied. As shown in FIG. 2, example current frame image layer hierarchy 200 includes a base image layer 202 (e.g., corresponding to current frame 102) that has been nonlinearly scaled by a factor greater than two to generate a first image layer 204 (level one) having a lower resolution than the base level image layer 202. The first layer 204 has also been nonlinearly scaled to generate a second image layer 206 (level two) having a lower resolution than the first image layer 204.

In various implementations, the same nonlinear scaling factor may be applied to generate layers 204 and 206. For example, to generate layer 204, each dimension of base layer 202 may be downsampled by a factor of three, while, to generate layer 206, each dimension of layer 204 may also be downsampled by a factor of three. However, as will be explained in greater detail below, the present disclosure is not limited to particular nonlinear scaling factors and contemplates downsampling by any factor greater than two and/or employing different scaling factors between image layer levels. Further, as will also be explained further below, the present disclosure is not limited to the application of only nonlinear scaling but also contemplates image layer hierarchies employing both nonlinear and linear scaling factors.

Figure 3:
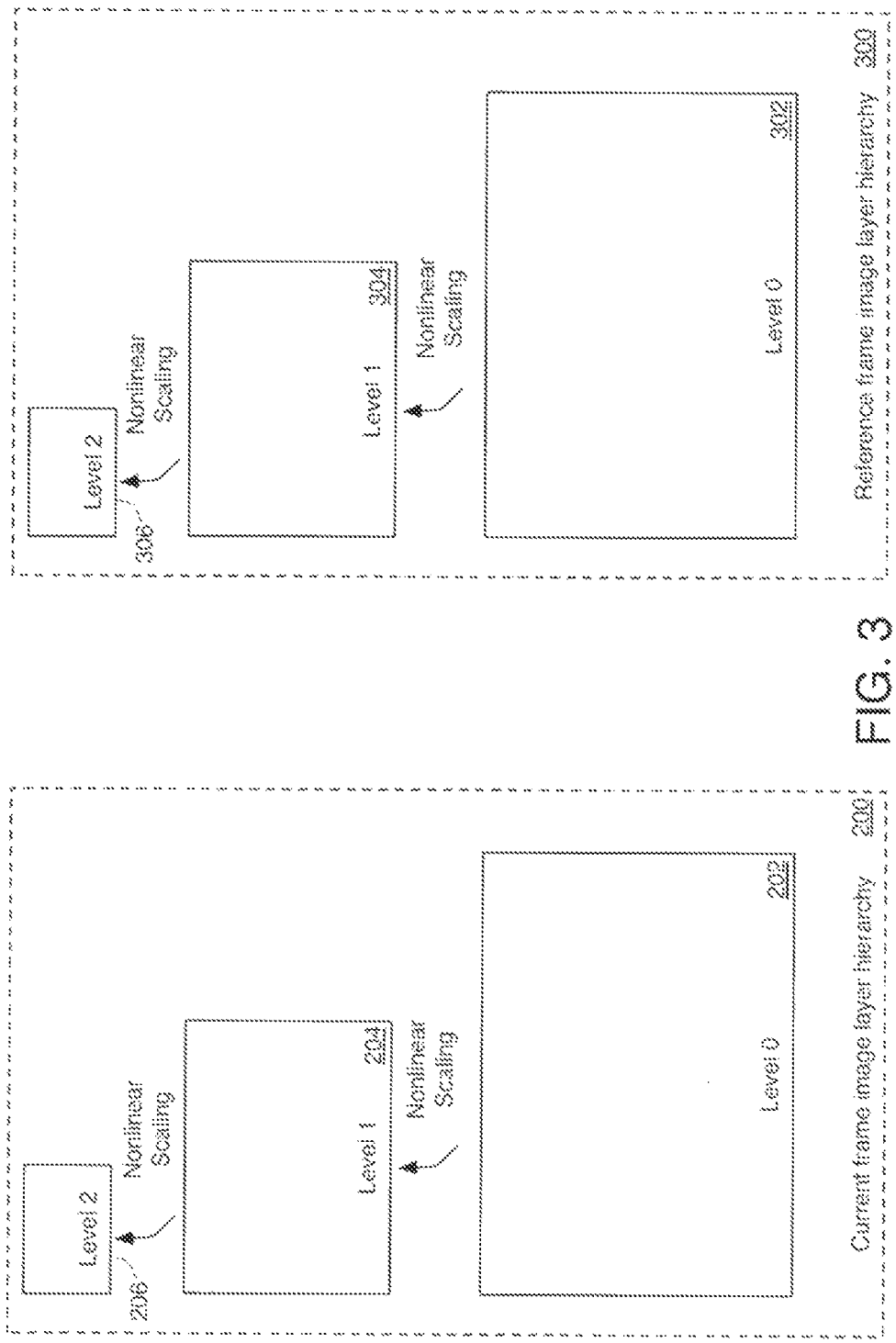
FIG. 3 is an illustrative diagram of an example nonlinear image scaling scheme.

When performing HME, image layer hierarchy 200 may be used in conjunction with a corresponding image layer hierarchy of a reference image frame. For example, FIG. 3 illustrates hierarchy 200 in the context of a corresponding reference frame nonlinear image layer hierarchy 300. In this example, hierarchy 300 includes a base image layer 302 (e.g., corresponding to reference frame 106) and two downsampled layers: a first layer 304 generated by applying the same nonlinear scaling to base layer 302 as was employed in forming layer 204 of hierarchy 200; and a second layer 306 generated by applying the same nonlinear scaling to level one layer 304. As will be explained in greater detail below, nonlinear image layer hierarchies 200 and 300 may be employed when undertaking HME processing of various macroblocks of base layer 202 of current frame 102.

While nonlinear image layer hierarchies 200 and 300 as depicted herein include three levels of image resolution, it should be understood that nonlinear image layer hierarchies in accordance with the present disclosure may be generated with any number of image layers. Generally, nonlinear image layer hierarchies in accordance with the present disclosure may be generated in accordance with the requirement of a particular application or the specifics of the input image frame, including for example, the size of the image, the content of the image and so forth. For example, a larger input image frame may require larger nonlinear image layer hierarchies employing more than three image layers. Further, it should be understood that the relative sizes and/or dimensions of various objects in FIGS. 2 and 3 may have been exaggerated in the interests of clarity.

Figure 4:
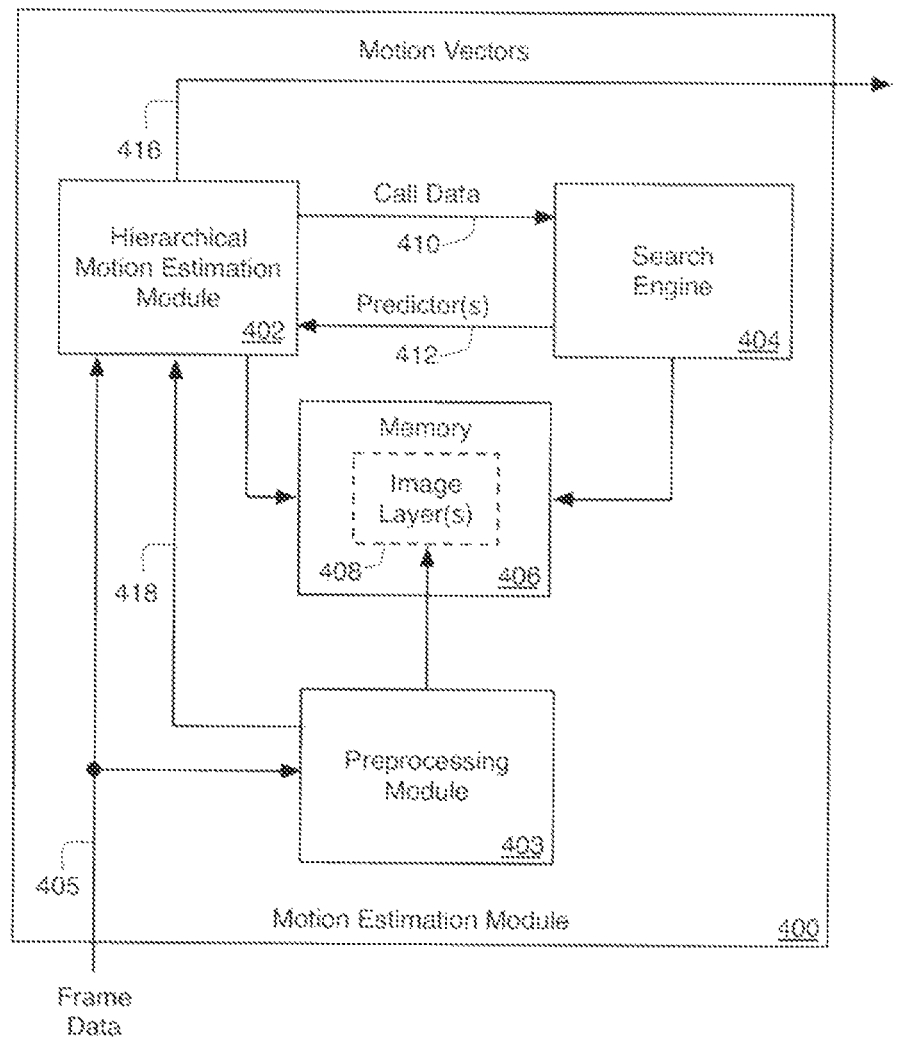
FIG. 4 illustrates an example motion estimation module.

In various embodiments, when undertaking motion estimation processing, video encoder system 100 may employ motion estimation module 104 to implement motion estimation (ME) schemes in accordance with the present disclosure. FIG. 4 illustrates an example ME module 400 in accordance with the present disclosure. By way of non-limiting example. ME module 400 may be implemented by module 104 of video encoder system 100.

In accordance with the present disclosure, ME module 400 includes a HME module 402, a preprocessing module 403, a motion search engine 404, and memory 406. As will be explained in greater detail below, module 400 may employ various nonlinear scaling schemes to generate a nonlinear hierarchy of current frame image layers (e.g., hierarchy 200) and a nonlinear hierarchy of reference frame image layers (e.g., hierarchy 300). When doing so, module 400 may use preprocessing module 403 to generate image layers from input frame data 405 including current and reference image frames (e.g., current frame 102 and at least one reference frame 106). Preprocessing module 403 may then store pixel data corresponding to one or more of the current and/or reference image layers 408 in memory 406. In response to motion call data 410 received from HME module 402, motion search engine 404 may use image layers 408 to perform HME for various macroblocks in current frame 102. When doing so, search engine 404 may access memory 406 to obtain pixel data corresponding to at least portions of image layers 408.

In various implementations, call data 410 may specify at least a target search area in a reference frame image layer and a source block location in a corresponding image layer of current frame 102. Motion search engine 404 may then employ known motion estimation methods to obtain one or more motion vectors or predictor(s) 412 for the source block and may provide predictor(s) 412 to HME module 402. HME module 402 may then use predictor(s) 412 to generate motion vectors 416 for various macroblocks of the current image frame.

In various embodiments, engine 404 may be implemented in hardware, while software may implement HME module 402 and preprocessing module 403. For example, in some embodiments, engine 404 may be implemented by ASIC logic while HME module 402 and preprocessing module 403 may be provided by software instructions executed by logic such as one or more processor cores. However, the present disclosure is not limited in this regard and HME module 402, preprocessing module 403 and/or search engine 404 may be implemented by any combination of hardware, firmware and/or software. In addition, memory 406 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 406 may be implemented by cache memory.

Figure 5:
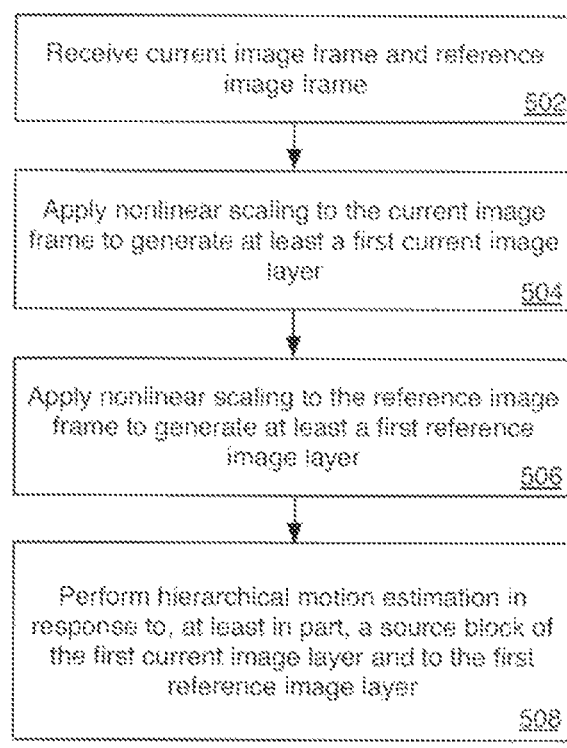
FIG. 5 is a flow diagram illustrating an example process.

FIG. 5 illustrates a flow diagram of an example process 500 according to various implementations of the present disclosure. Process 500 may include one or more operations, functions or actions as illustrated by one or more of blocks 502, 504, 506 and 508 of FIG. 5. By way of non-limiting example, process 500 will be described herein with reference to nonlinear hierarchies 200) and 300 of FIGS. 2 and 3, video encoder system 100 of FIG. 1 and motion estimation module 400 of FIG. 4. In various implementations, process 500 may form at least part of a block matching algorithm (BMA) of a motion estimation process implemented by encoder system 100.

Process 500 may begin at block 502 where a current image frame and a reference image frame may be received. In various implementations, block 502 may involve HME module 402 receiving frame data 405 in the form of luma pixel values of current frame 102 and luma pixel values of reference frame 106. The frame data received at block 502 is not limited to any particular image frame data and may have any resolution, data depth and/or data format.

At block 504, nonlinear scaling may be applied to the current image frame to generate at least a first current image layer. For instance, referring to FIG. 3, nonlinear scaling may be applied to base layer 202 to generate first level layer 204 corresponding to the first current image layer. Additional current image layers may also be generated at block 504. For example, block 504 may also involve applying nonlinear scaling to layer 204 to generate second level layer 206 corresponding to a second current image layer, and so forth.

At block 506, nonlinear scaling may be applied to the reference image frame to generate at least a first reference image layer. For instance, referring again to FIG. 3, nonlinear scaling may be applied to the reference frame base layer 302 to generate first level layer 304 corresponding to the first reference image layer. Additional reference image layers may also be generated at block 506. For example, block 506 may also involve applying nonlinear scaling to layer 304 to generate second level layer 206 corresponding to a second reference image layer, and so forth.

In accordance with various implementations, the nonlinear scaling employed at blocks 504 and 506 may include the scaling of each dimension of a current image layer by a factor (N) having a value greater than two. For instance, in a non-limiting example, for a current image frame (e.g., frame 102) having a resolution of 1080p such that it includes 1,920 columns by 1,080 rows of luma pixel values (e.g., 1920×1080), block 502 may involve scaling each dimension by N=3 to generate a first current image layer having a resolution of 640 columns by 360 rows of luma pixel values (e.g., 640×360).

In various implementations, noninteger or fractional scaling factors may be employed. For instance, in another non-limiting example, for a current image frame having a resolution of 1080p or 1920×1080 pixel values, block 502 may involve scaling each dimension by a factor of N=2.5 to generate a first current image layer having a resolution of 768×432 pixel values. For instance, scaling by N=2.5 may be implemented by upsampling an image by two and then downsamping the upsampled image by five to generate the corresponding image layer. Of course, depending on the resolution of an input image frame, different integer or noninteger nonlinear scaling factors may be employed in accordance with the present disclosure to generate various image layer resolutions.

Further, the present disclosure is not limited to employing only nonlinear scaling factors that yield image layers having integer resolution values. For instance, in a non-limiting example, for a current image frame having a resolution of 1920×1080 pixel values, block 502 may involve scaling each dimension by a factor of three to generate a first current image layer having a resolution of 640×360. Applying the same factor of N=3 to the 640×360 first current image layer will generate a second current image layer having a resolution of 213.33×120. In such implementations, the fractional frame dimension(s) in the resulting image layer (in this example, a fractional image column) may be ignored or may be replaced with pixel values using known techniques (e.g., assigning nearest neighbor pixel values, and the like).

Figure 6:
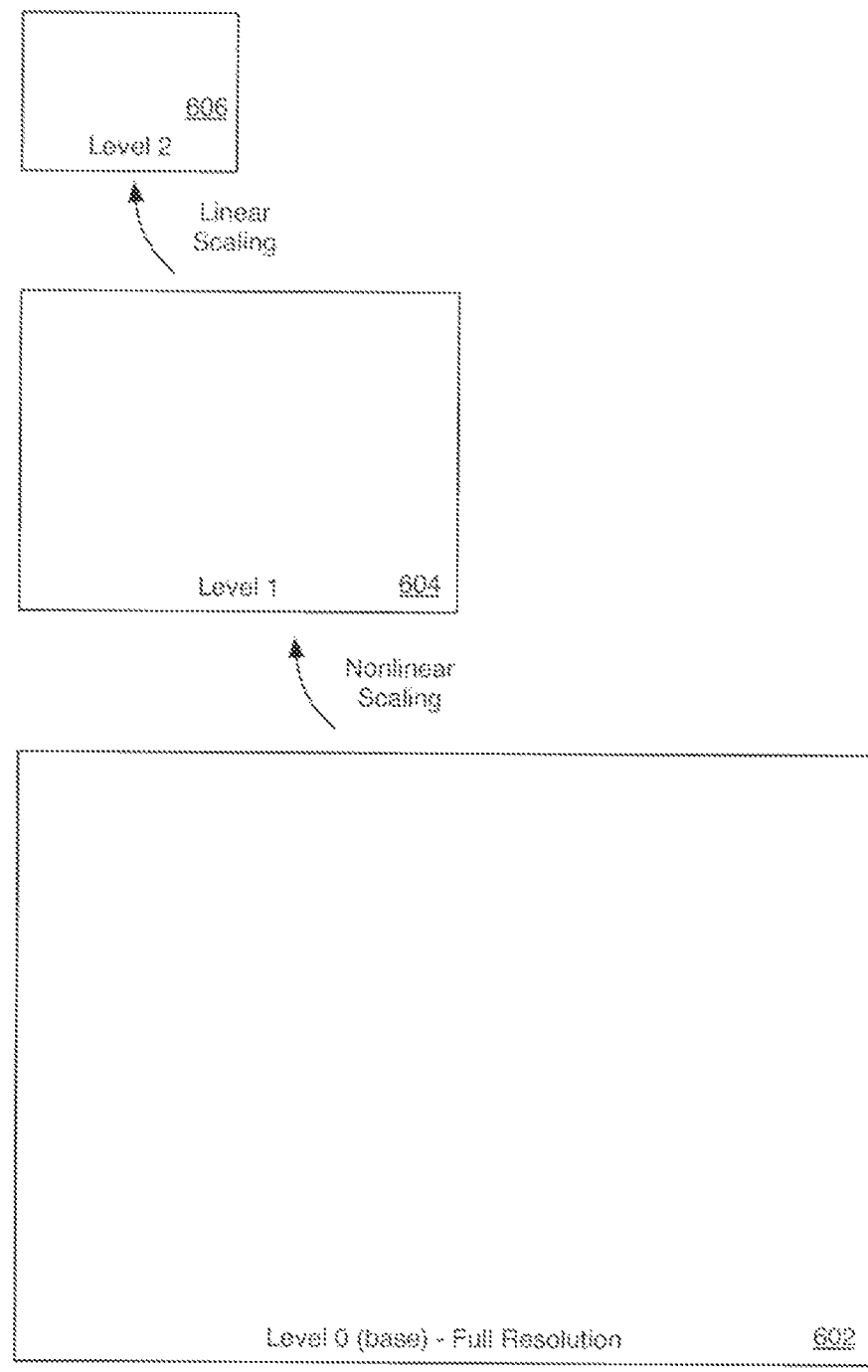
FIG. 6 is an illustrative diagram of an example mixed scaling scheme.

In addition, mixed nonlinear scaling schemes in accordance with the present disclosure may employ nonlinear scaling between some image layers while employing linear scaling between other image layers within the same nonlinear image layer hierarchy. For example, FIG. 6 illustrates a mixed scheme nonlinear image layer hierarchy 600 where a full resolution frame 602 (e.g., a current frame or a reference frame) is subjected to nonlinear scaling to generate a first level image layer 604. Layer 604 is then subjected to linear scaling to generate a second level image layer 606. For instance, in a non-limiting example, if base level 602 has a resolution of 1080p, then a nonlinear scaling factor of N=3 may be applied to generate first level layer 604 having a resolution of 640×360. First level layer 604 may then be subjected to linear scaling by a factor of N=2 to generate second level layer 606 having a resolution of 320×180. In another non-limiting example, for an image frame 602 resolution of 1280×720, a noninteger nonlinear scaling factor of N=2.5 may be applied to generate first level layer 604 with a resolution of 512×288. First level layer 604 may then be subjected to linear scaling by a factor of two to generate second level layer 606 having a resolution of 256×144. In other implementations, linear scaling may be applied to generate a first image layer, while nonlinear scaling may be applied to the first image layer to generate a second image layer, and so forth.

In accordance with various implementations, nonlinear scaling at blocks 504 and 506 may be undertaken in conjunction with various filtering techniques. For example, when downsampling using a nonlinear scaling factor at blocks 504 and 506, an image layer may be subjected to low-pass filtering using any of a number of known smoothing or local averaging operators, kernels or filters such as, but not limited to, a 3×3 smoothing filter, a 5×5 smoothing filter or the like. For instance, in a non-limiting example, a 3×3 smoothing filter may have form $$f = \begin{bmatrix} 0 & 1/8 & 0 \\ 1/8 & 1/2 & 1/8 \\ 0 & 1/8 & 0 \end{bmatrix}$$

The present disclosure is not, however, limited to employing smoothing filters when undertaking downsampling at blocks 504 and 506. For example, when undertaking blocks 504 and 506, nearest neighbor subsampling may be employed. In addition, in various implementations, known decimation filters may be applied at blocks 504 and 506.

Referring to FIG. 4, blocks 504 and 506 may be undertaken by preprocessing module 403. For example, block 504 may involve module 403 performing nonlinear scaling on current frame 102 to generate one or more downsampled image layers that module 403 may store in memory 406. Similarly, block 504 may involve module 403 performing nonlinear scaling on reference frame 106 to generate one or more downsampled image layers that module 403 may also store in memory 406. When performing blocks 504 and 506, preprocessing module 403 may employ various filtering techniques as described above.

Process 500 may conclude at block 508 where hierarchical motion estimation may be performed in response to, at least in part, a source block of the first current image layer and to the first reference image layer. In various implementations, block 508 may include generating a motion vector field corresponding to the source block of the first current image layer. A best candidate motion vector may then be identified within the motion vector field using known motion vector costing techniques.

Referring again to FIGS. 2 and 3, for a given macroblock 208 (e.g., a 16×16 macroblock) of base layer 202, hierarchical motion estimation may be performed at block 508 using a corresponding source block 210 of level two layer 206 to perform a motion search of a corresponding search region (not shown) in level two layer 306 of reference frame image layer hierarchy 300. Best candidate motion vectors or predictors resulting from the motion search using macroblock 210 may then be propagated to level one layer 204 for refinement by further motion searching.

During propagation, a predictor's coordinates may be upsampled (e.g., multiplied) by the same nonlinear scaling factor that was used at blocks 504 and 506 to generate the current and reference image layers. The predictor(s) propagated to level one layer 204 may then be used to perform a refined motion search for at least a macroblock 212 of layer 204 within a search region (not shown) in level one layer 304 of hierarchy 300. Finally, in the examples of nonlinear hierarchies 200 and 300, predictor(s) generated for level 204 may be propagated to level 202 and motion searching may be completed for full resolution macroblock 208.

Referring again to FIG. 4, in various implementations, hierarchical motion estimation performed at block 508 may involve HME module 402 issuing call data 410 specifying at least a target search area in a reference frame image layer and a source block location in a corresponding image layer of current frame 102. In response to call data 410, motion search engine 404 may then employ known motion estimation methods using image layers 408 to obtain one or more motion vectors or predictor(s) 412 for the source block and may provide predictor(s) 412 to HME module 402. For example, engine 404 may store a corresponding motion vector field in memory 406 for access by HME module 402. HME module 402 may then use predictor(s) 412 to generate motion vectors 416 for various macroblocks of the current image frame. For example, HME module 402 may employ known motion vector costing techniques to determine one or more best motion vector candidates from the motion vector field.

Figure 7:
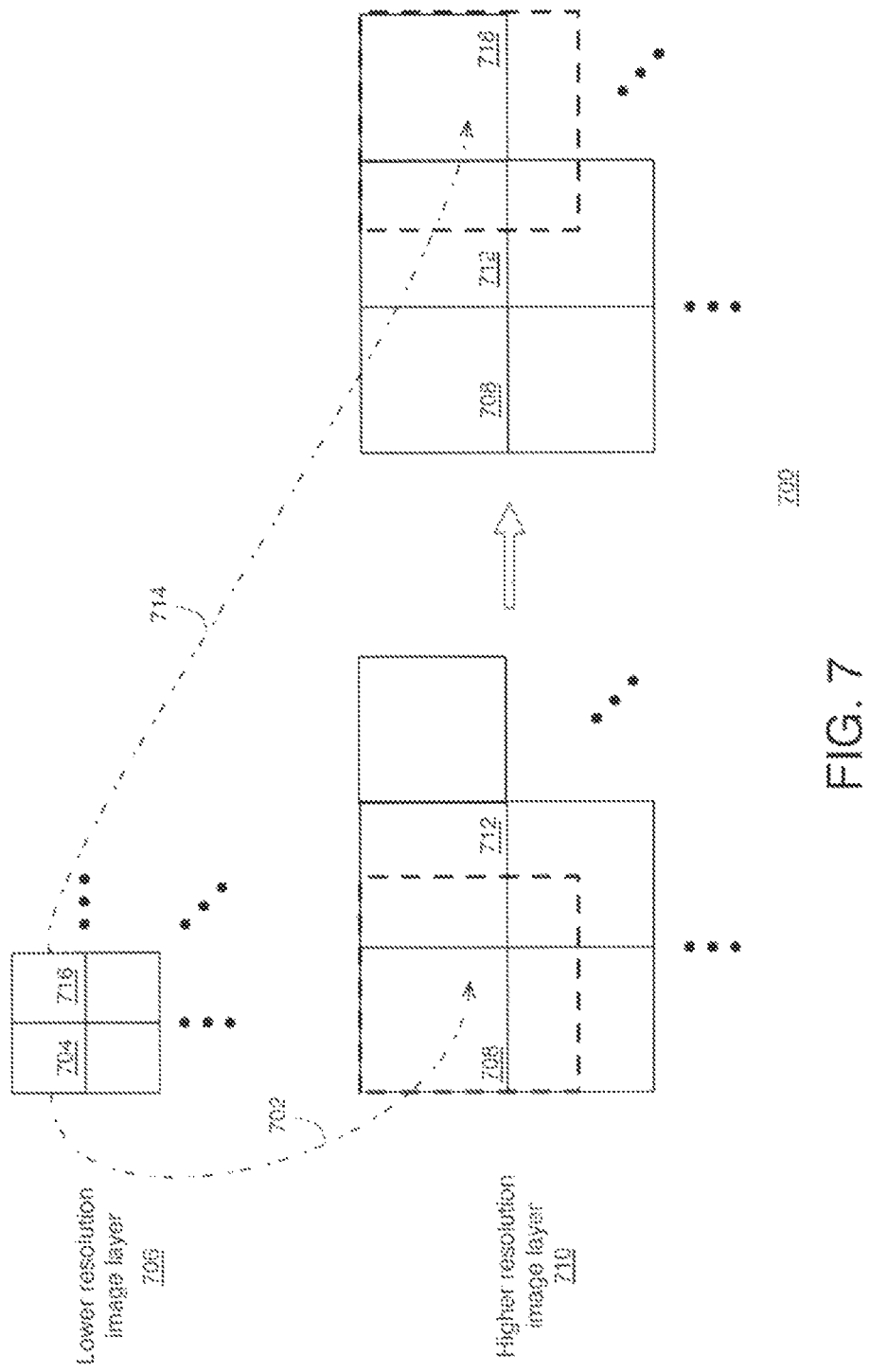
FIG. 7 is an illustrative diagram of an example propagation scheme.

In various implementations, predictors propagated during motion estimation at block 508 may not align with macroblock boundaries in the higher resolution layer. FIG. 7 illustrates an example propagation scheme 700 where a predictor 702 associated with a source block 704 of a lower resolution image layer 706 may overlap macroblock boundaries associated with a corresponding macroblock 708 of a higher resolution image layer 710. For instance, assuming a nonlinear scaling factor of N=3, if source block 704 has size 8×8, predictor 702 will have size 24×24 when upsampled to layer 710, and, assuming macroblock 708 has size 16×16, will align with macroblock 708 but will also overlap the boundary of macroblock 708 to align with half of a next macroblock 712 of layer 710. Similarly, a predictor 714 for a next source block 716 of layer 706 may, when propagated to layer 710, overlap both macroblock 712 and a next macroblock 718 in layer 710.

Thus, in accordance with various embodiments, when undertaking hierarchical motion estimation at block 508, a macroblock of a higher resolution image layer may be associated with more than one predictor upsampled from a lower resolution image layer. For instance, in the example of FIG. 7, both of predictors 702 and 714 align with macroblock 712 of layer 710. In accordance with the present disclosure various approaches may be applied when more than one predictor aligns with a macroblock. For example, both predictors 702 and 714 may be used for used to perform motion estimation for macroblock 712. Alternatively, a modified predictor may be generated for macroblock 712 by determining a weighted average of predictors 702 and 714 based on the degree of overlap. In the example of scheme 700, where predictors 702 and 714 equally overlap macroblock 712, the median value of predictors 702 and 714 may be used as a modified predictor for macroblock 712. In other implementations, a best predictor for a given macroblock may be selected as the predictor having the greatest degree of overlap with the macroblock, and so on.

In various implementations the hierarchical motion estimation of block 508 may include various approaches that have not been explained in greater detail herein in the interest of clarity. For example, multiple predictors, such as the best four predictors, may be propagated between image layers. In another example, the best predictors for propagation may be determined in response to predictors of neighboring macroblocks. Clearly, many additional temporal and/or spatial optimization techniques may be employed in conjunction with the approaches described herein.

Figure 8:
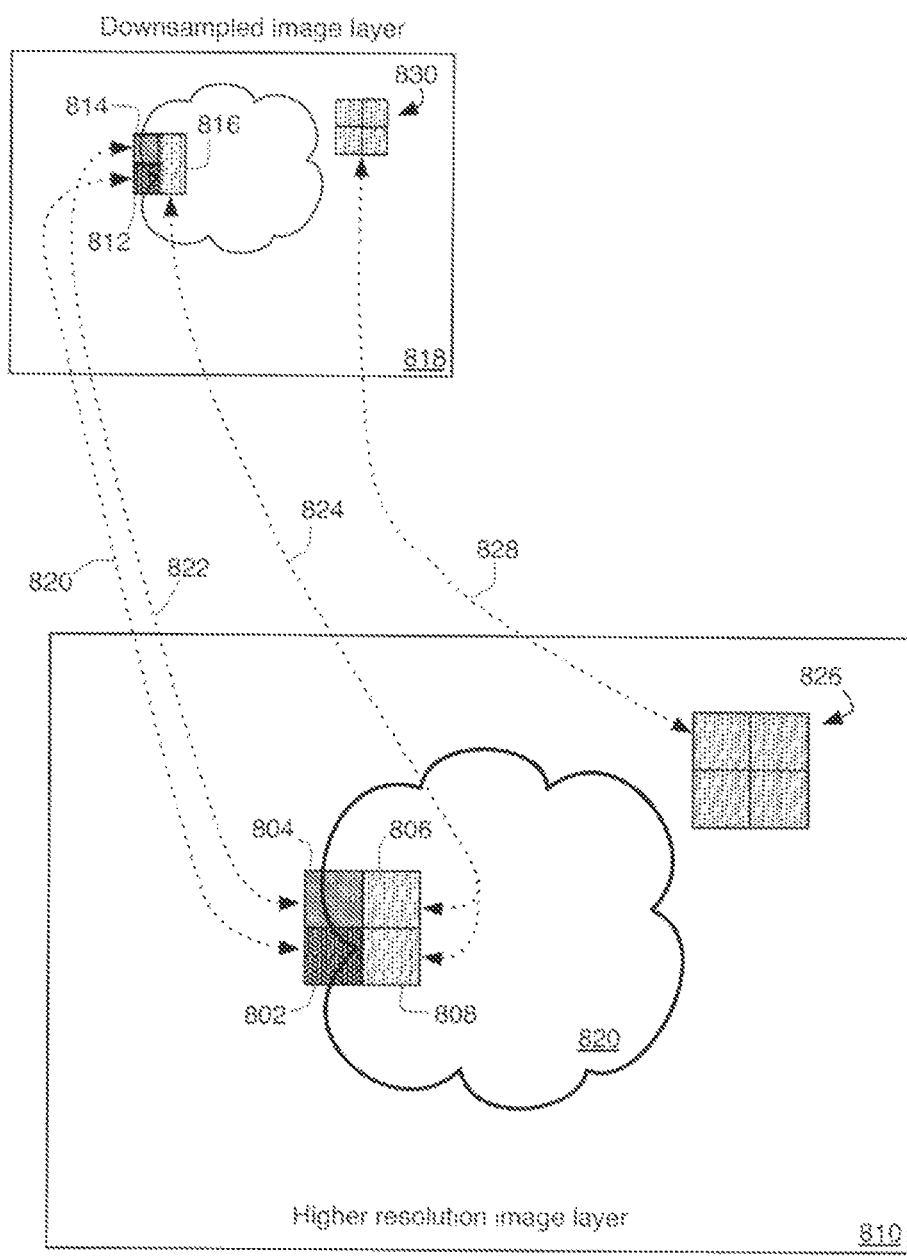
FIG. 8 is an illustrative diagram of an example adaptive source block size scheme.

In accordance with the present disclosure, HME may also be performed using adaptively determined source block sizes. For instance, FIG. 8 illustrates an example adaptive source block size scheme 800 in accordance with the present disclosure. In example scheme 800 various macroblocks 802, 804, 806, and 808 of a higher resolution image layer 810 (e.g., base layer) utilize predictors derived from various, adaptively shaped source blocks 812, 814 and 816 of a lower resolution downsample layer 818. In the particular example of FIG. 8, macroblock 802 uses a predictor 820 associated with source block 812, macroblock 804 uses a predictor 822 associated with source block 814, and both macroblocks 806 and 808 utilize a single predictor 824 associated with a different sized source block 816. In one example, macroblocks 802-808 are 16×16 blocks, source blocks 812 and 814 are 8×8 blocks and source block 816 is an 8×16 block.

Scheme 800 is presented herein solely for the purposes of discussion as a non-limiting example and is not intended to precisely portray an actual image processing scheme. For example, those of skill in the art will recognize that macroblocks 802-808 are not necessarily depicted to scale with respect to layer 810, and so forth. Moreover, the present disclosure is not limited to any particular sizes and/or shapes of adaptively determined source blocks.

By adaptively determining source block size, HME schemes in accordance with the present disclosure may provide various advantages. For instance, adaptively determining source block size may provide for more accurate motion estimation in high energy image regions and/or in image regions undergoing complex motion while also providing better motion vector cohesion in lower complexity image regions and/or in image regions exhibiting more uniform motion. By contrast, without adaptive source block size determination, HME processing may be insensitive to image complexity which may result in inaccurate motion estimation in complex image regions and/or poor motion vector cohesion in less complex image regions. In general, adaptively determining source block size in accordance with the present disclosure may allow for the improved balancing of computing resource usage with motion estimation fidelity.

In accordance with the present disclosure, the size and/or shape of source blocks may be determined adaptively in response to temporal and/or spatial image characteristics. For instance, the presence of an object 820 in the image layers may result in various spatial image characteristics (e.g., the presence or absence of edges) associated with particular macroblocks: in this example, macroblocks 802-808. Hence, in various implementations, when performing HME the appearance of edges within macroblocks 802 and 804 may be used to advantageously select a smaller size for source blocks 812 and 814. By selecting smaller sizes for source blocks 812 and 814, higher precision predictors may be obtained to better account for the more detailed image regions corresponding to macroblocks 802 and 804.

On the other hand, the more uniform image characteristics (e.g., lack of edges) within macroblocks 806 and 808 may be used to advantageously select a larger source block size for these macroblocks. Thus, by selecting a larger size for source block 816, and by applying the resulting predictor to both macroblocks 806 and 808, greater predictor cohesion may be provided for macroblocks 806 and 808. For instance, in the example of scheme 800, where macroblocks 806 and 808 may be expected to exhibit similar motion characteristics (e.g., both macroblocks 806 and 808 are associated with a more uniform, interior portion of object 820), improved predictor cohesion may make it more likely that a skip predictor matches predictor 824 thereby avoiding a redundant motion search. In this example, employing larger-sized source block 816 to generate a predictor for both of macroblocks 806 and 808 may increase the likelihood that a predictor previously generated for macroblock 806 may be used as a skip predictor for macroblock 808. As another example, a group of four macroblocks 826 appearing in a relatively low energy region of image layer 810 may advantageously use a single predictor 828 associated with a corresponding group of four source blocks 830 in image layer 818. While the example of FIG. 8 has been described herein in terms of source blocks having 8×8 and 8×16 sizes, the present disclosure contemplates any size of source block including 16×16, 16×8, 8×16, 8×8, 8×4, 4×8, 4×4, and so forth.

In accordance with the present disclosure, temporal image characteristics may also be utilized to adaptively determine block source size. For example, larger source block sizes may be selected for image regions that have a history of uniform motion. This may be the case even for spatially complex regions. Hence, in such circumstances, previously determined predictors for one or more adjacent macroblocks may be used to determine a source block size for a current macroblock.

Figure 9:
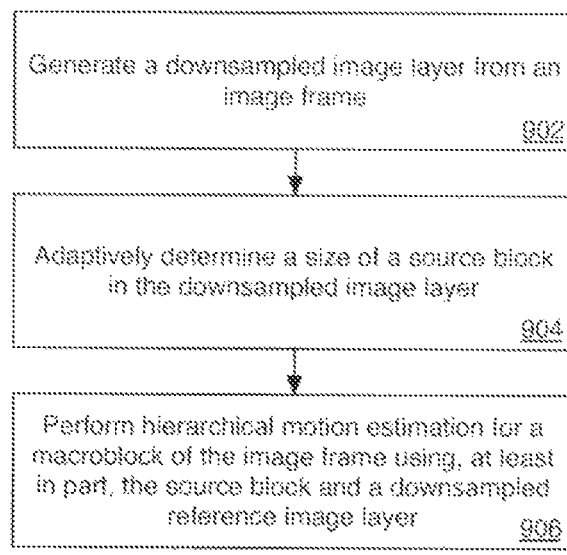
FIG. 9 is a flow diagram illustrating an example process.

FIG. 9 illustrates a flow diagram of an example process 900 according to various implementations of the present disclosure. Process 900 may include one or more operations, functions or actions as illustrated by one or more of blocks 902, 904 and 906 of FIG. 9. By way of non-limiting example, process 900 will be described herein with reference to scheme 800 of FIG. 8, video encoder system 100 of FIG. 1, and HME module 400 of FIG. 4. In various implementations, process 900 may form at least part of a block matching algorithm (BMA) of a motion estimation process implemented by encoder system 100.

Process 900 may begin at block 602 where a downsampled image layer may be generated from an image frame. For example, as described above with reference to FIG. 5, preprocessing module 403 may generate at least one lower resolution image layer from input frame data 405. In various implementations, preprocessing module 403 may employ linear or nonlinear scaling factors to generate a downsampled image layer at block 902.

At block 904, a source block size in the downsampled image layer may be adaptively determined. In various implementations, block 904 may include determining the size of the source block in response to spatial and/or temporal image characteristics associated with a location of the source block in the downsampled image layer. In various implementations, adaptively determining the size of the source block at block 904 may include determining the source block size in response to preprocessing of the image frame. For instance, preprocessing module 403 may perform preprocessing such as edge detection, and the like to determine image complexity of the input image frame and may provide corresponding image complexity information 418 to HME module 402. In response to information 418, HME module 402 may determine a corresponding source block size to be used for motion estimation purposes for a given macroblock. For instance, smaller source block sizes may be used for macroblocks in image regions having greater image complexity.

In various implementations, adaptively determining the size of the source block at block 904 may include determining the source block size in real time in response to motion vector costing analysis of the input image frame. For instance, when determining source block size for a given macroblock, HME module 402 may generate a predictor for each of a number of candidate source block sizes and, based on analysis of factors such as the size of the displaced frame difference for each candidate source block size, may select a particular candidate source block size for the source block.

Process 900 may conclude at block 906 where hierarchical motion estimation may be performed for a macroblock of the image frame using, at least in part, the source block and a downsampled reference image layer. In various implementations, block 906 may be undertaken in a manner similar to that discussed above in the context for block 508 of FIG. 5 where hierarchical motion estimation may be performed using the source block size as adaptively determined at block 904.

While implementation of example processes 500 and 900, as illustrated in FIGS. 5 and 9, may include the undertaking of all blocks shown in the order illustrated, the present disclosure is not limited in this regard and, in various examples, implementation of processes 500 and 900 may include the undertaking only a subset of the blocks shown and/or in a different order than illustrated.

In addition, any one or more of the blocks of FIGS. 5 and 9 may be undertaken in response to instructions provided by one or more computer program products. Such program products may include signal bearing media providing instructions that, when executed by, for example, a processor, may provide the functionality described herein. The computer program products may be provided in any form of machine-readable medium. Thus, for example, a processor including one or more processor core(s) may undertake one or more of the blocks shown in FIGS. 5 and 9 in response to program code and/or instructions or instruction sets conveyed to the processor by a machine-readable medium. In general, a machine-readable medium may convey software in the form of program code and/or instructions or instruction sets that may cause any of the devices and/or systems described herein to implement at least portions of video encoder system 100 and/or ME module 400.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
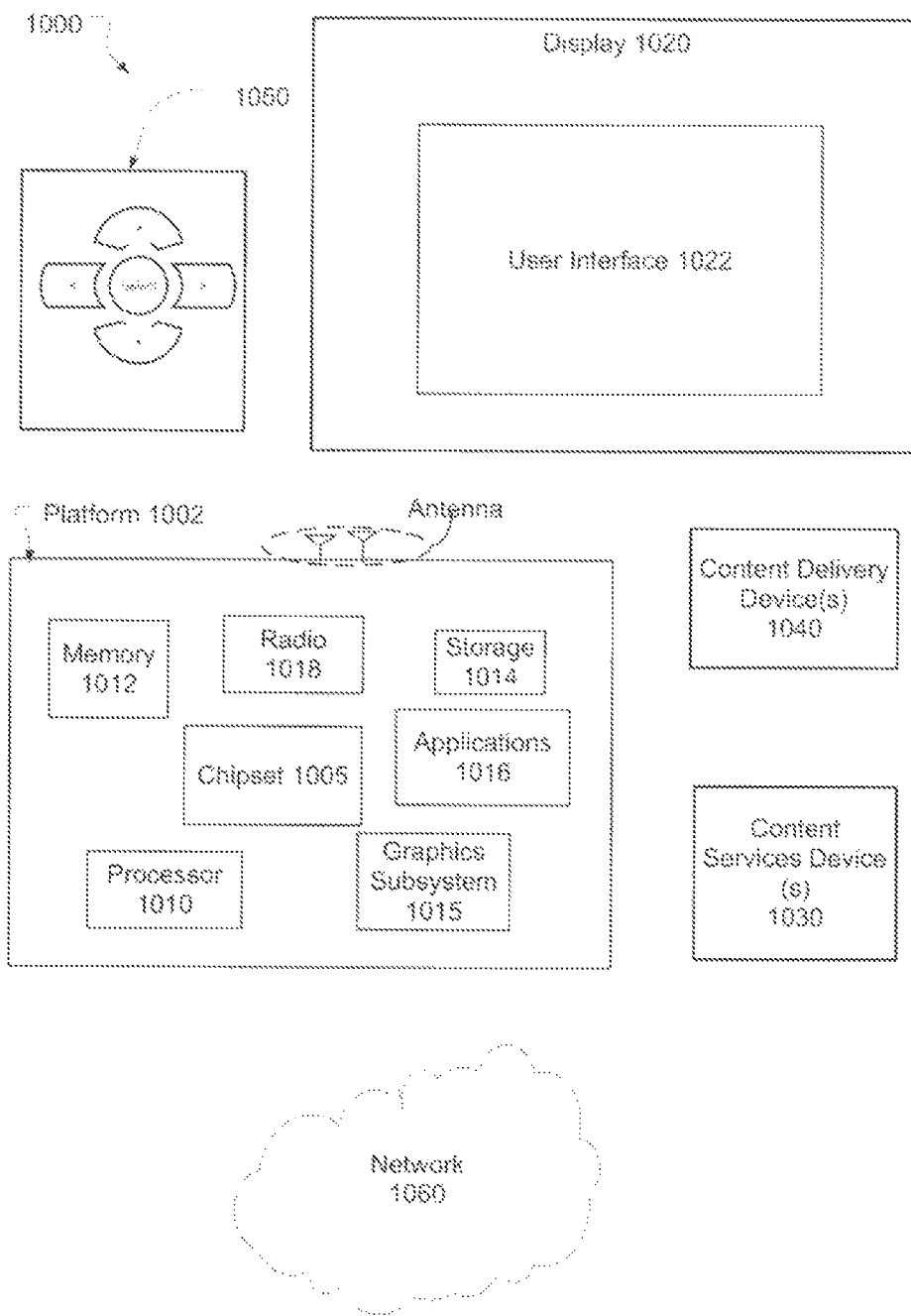
FIG. 10 is an illustrative diagram of an example system.

FIG. 10 illustrates an example system 1000 in accordance with the present disclosure. In various implementations, system 1000 may be a media system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g. smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone card communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In a further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of unidirectionally or bidirectionally communicating content between content providers and platform 1002 and/display 1020, via network 1060 or directly. It will be appreciated that the content may be communicated unidirectionally and/or bidirectionally to and from any one of the components in system 100 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
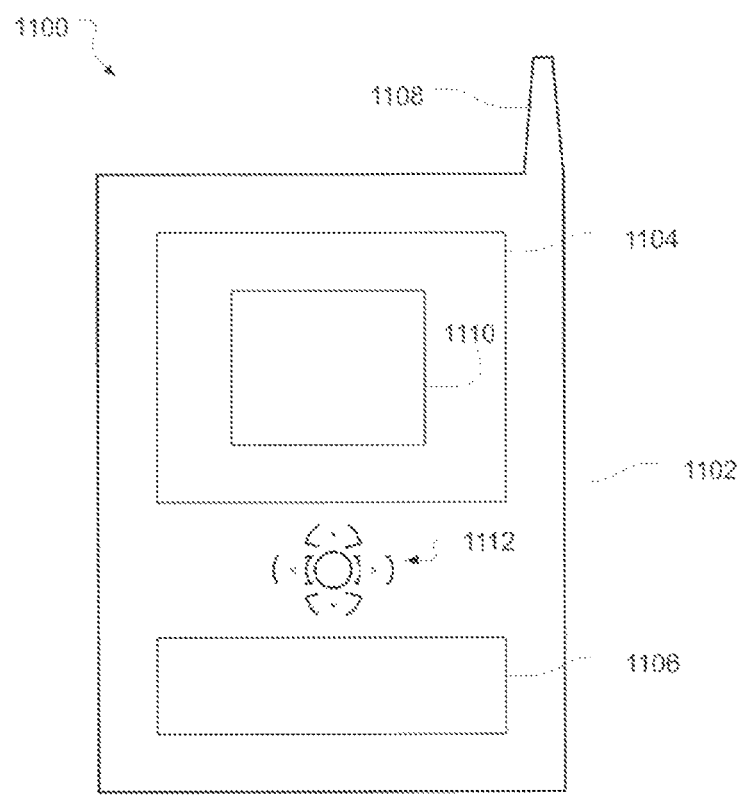
FIG. 11 illustrates an example device, all arranged in accordance with at least some implementations of the present disclosure.

As described above, system 1000 may be embodied in varying physical styles or form factors. FIG. 11 illustrates implementations of a small form factor device 1100 in which system 1000 may be embodied. In various embodiments, for example, device 1100 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing 1102, a display 1104, an input/output (I/O) device 1106, and an antenna 1108. Device 1100 also may include navigation features 1112. Display 1104 may include any suitable display unit for displaying information appropriate for a mobile computing device. I/O device 1106 may include any suitable I/O device for entering information into a mobile computing device. Examples for I/O device 1106 may include an alphanumeric keyboard, a numeric keypad, a touch pad, input keys, buttons, switches, rocker switches, microphones, speakers, voice recognition device and software, and so forth. Information also may be entered into device 1100 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In accordance with the present disclosure, a current image frame and a reference image frame may be received. Nonlinear scaling may be applied to the current image frame to generate at least a first current image layer and nonlinear scaling may be applied to the reference image frame to generate at least a first reference image layer. Hierarchical motion estimation may then be performed in response, at least in part, to a source block of the first current image layer and to the first reference image layer. In various examples, applying nonlinear scaling to the current image frame corresponds to scaling each dimension of the current image frame by a scaling factor having a value greater than two. In some examples the scaling factor may have a value greater than two and less than four. In various examples, performing hierarchical motion estimation may include generating a motion vector field corresponding to the source block of the first current image layer and identifying a best candidate motion vector in the motion vector field. In various examples, nonlinear scaling may be applied to the first current image layer to generate a second current image layer. In other examples, linear scaling may be applied to the first current image layer to generate a second current image layer. For instance, the linear scaling may correspond to scaling each dimension of the first current image layer by a factor of two.

In accordance with the present disclosure, a downsampled image layer may be generated from an image frame, a size of a source block in the downsampled image layer may be adaptively determined, and hierarchical motion estimation may be performed for a macroblock of the image frame using, at least in part, the source block and a downsampled reference image layer. In various examples, adaptively determining the size of the source block may include determining the size of the source block in response to image characteristics associated with a location of the source block in the downsampled image layer. The image characteristics may be temporal or spatial image characteristics. In various examples, adaptively determining the size of the source block may include determining the source block size in response to preprocessing of the image frame. Preprocessing of the image frame may include determining image complexity of the image frame. In various examples, adaptively determining the size of the source block may include determining the source block size in real time in response to motion vector costing.

What is claimed:

1. A motion estimation method, comprising:
   receiving, via a video coder, a current image frame and a reference image frame;
   applying, via the video coder, nonlinear scaling to the current image frame to generate at least a first current image layer;
   applying, via the video coder, nonlinear scaling to the reference image frame to generate at least a first reference image layer; and
   performing, via the video coder, hierarchical motion estimation in response, at least in part, to a source block of the first current image layer and to the firs reference image layer.

2. The method of claim 1, wherein applying nonlinear scaling to the current image frame comprises scaling each dimension of the current image frame by a scaling factor having a value greater than two.

3. The method of claim 1, wherein the scaling factor comprises a value greater than two and less than four.

4. The method of claim 1, wherein performing hierarchical motion estimation comprise:
   generating a motion vector field corresponding to the source block of the first current image layer; and
   identifying a best candidate motion vector in the motion vector field.

5. The method of claim 1, further comprising:
   applying nonlinear scaling to the first current image layer to generate a second current image layer.

6. The method of claim 1, further comprising:
   Applying linear scaling to the first current image layer to generate a second current image layer.

7. The method of claim 1, wherein applying linear scaling to the first current image layer comprises scaling each dimension of the first current image layer by a factor of two.

8. The method of claim 1, further comprising
   adaptively determining a size of the source block in the nonlinear scaled current image layer; and
   wherein performing hierarchical motion estimation further comprises: performing hierarchical motion estimation for a macroblock of the current image frame using, at least in part, the source block and the nonlinear scaled referenced image layer,
   wherein adaptively determining the size of the source block comprises determining the size of the source block in response to image characteristics associated with a location of the source block in the nonlinear scaled current image layer.

9. At least one non-transitory machine readable medium comprising a plurality of instructions that in response to being executed on a computing device, cause the computing device to perform operation, comprising:
   receive a current image frame and a reference image frame;
   applying nonlinear scaling to the current image frame to generate a t least a first current image layer;
   applying nonlinear scaling to the reference image frame to generate at least a first reference image layer; and
   performing hierarchical motion estimation in response, at least in part, to a source block of the first current image layer and to the first reference image layer.

10. The non-transitory machine readable medium of claim 9, further comprising:
   adaptively determining a size of the source block in the nonlinear scaled current image layer; and
   wherein performing hierarchical motion estimation further comprises: performing hierarchical motion estimation for a macroblock of the current image frame using, at least in part, the source block and the nonlinear scaled referenced image layer,
   wherein adaptively determining the size of the source block comprises determining the size of the source block in response to image characteristics associated with a location of the source block in the nonlinear scaled current image layer.

11. A system for video coding on a computer, comprising:
   means for receiving a current image frame and a reference image frame;
   means for applying nonlinear scaling to the current image frame to generate at least a first current image layer;
   means for applying nonlinear scaling to the reference image frame to generate at least a first reference image layer; and
   means for performing hierarchical motion estimation in response, at least in part, to a source block of the first current image layer and to the first reference image layer.

12. The system of claim 11, wherein applying nonlinear scaling to the current image frame comprises scaling each dimension of the current image frame by a scaling factor having a value greater than two.

13. The system of claim 11, wherein the scaling factor comprises a value greater than two and less than four.

14. The system of claim 11, wherein performing hierarchical motion estimation comprises:
   means for generating a motion vector field corresponding to the source block of the first current image layer; and
   means for identifying a best candidate motion vector in the motion vector field.

15. The system of claim 11, further comprising:
   means for applying nonlinear scaling to the first current image layer to generate a second current image layer.

16. The system of claim 11, further comprising:
   means for applying linear scaling to the first current image layer to generate a second current image layer, wherein applying linear scaling to the first current image layer comprises scaling each dimension of the first current image layer by a factor of two.

17. The system of claim 11, further comprising:
   means for adaptively determining a size of the source block in the nonlinear scaled current image layer; and
   wherein performing hierarchical motion estimation further comprises: performing hierarchical motion estimation for a macroblock of the current image frame using, at least in part, the source block and the nonlinear scaled referenced image layer,
   wherein adaptively determining the size of the source block comprises determining the size of the source block in response to image characteristics associated with a location of the source block in the nonlinear scaled current image layer.

18. A motion estimation method, comprising:
   generating a downsampled image layer from an image frame;

adaptively determining a size of a source block in the downsampled image layer; and performing hierarchical motion estimation for a macroblock of the image frame using, at least in part, the source block and a downsampled referenced image layer, wherein adaptively determining the size of the source block comprises determining the size of the source block in response to image characteristics associated with a location of the source block in the downsampled image layer.

19. The method of claim 18, wherein the image characteristics comprise at least one of temporal or spatial image characteristics.

20. The method of claim 19, wherein adaptively determining the size of the source block comprises determining the source block size in response to preprocessing of the image frame.

21. The method of claim 18, wherein preprocessing of the image frame comprises determining image complexity of the image frame, wherein adaptively determining the size of the source block comprises determining the source block size in real time in response to motion vector costing.

22. A system for video coding on a computer, comprising:
means for generating a downsampled image layer from an image frame;
means for adaptively determining a size of a source block in the down sampled image layer; and
means for performing hierarchical motion estimation for a macroblock of the image frame using, at least in part, the source block and a downsampled reference image layer,
wherein adaptively determining the size of the source block comprises determining the size of the source block in response to image characteristics associated with a location of the source block in the downsampled image layer.

23. The system of claim 22, wherein the image characteristics comprise at least one of temporal or spatial image characteristics.

24. The system of claim 22, wherein adaptively determining the size of the source block comprises determining the source block size in response to preprocessing of the image frame.

25. The system of claim 22, wherein preprocessing of the image frame comprises determining image complexity of the image frame, wherein adaptively determining the size of the source block comprises determining the source block size in real time in response to motion vector costing.

26. At least one non-transitory machine readable medium comprising a plurality of instructions that in response to being executed on a computing device, cause the computing device to perform operation, comprising:
generating a downsampled image layer from an image frame;
adaptively determining a size of a source block in the downsampled image layer; and
performing a hierarchical motion estimation for a macroblock of the image frame using, at least in part, the source block and a downsampled reference image layer,
wherein adaptively determining the size of the source block comprises determining the size of the source block in response to image characteristics associated with a location of the source block in the downsampled image layer.

* * * * *